(12) United States Patent
Lin

(10) Patent No.: US 8,433,844 B2
(45) Date of Patent: Apr. 30, 2013

(54) METHOD FOR MANAGING A MEMORY DEVICE HAVING MULTIPLE CHANNELS AND MULTIPLE WAYS, AND ASSOCIATED MEMORY DEVICE AND CONTROLLER THEREOF

(75) Inventor: Jen-Wen Lin, Kaohsiung (TW)

(73) Assignee: Silicon Motion Inc., Jhubei, Hsinchu County (TW)

( * ) Notice: Subject to any disclaimer, the term of this patent is extended or adjusted under 35 U.S.C. 154(b) by 263 days.

(21) Appl. No.: 12/696,060

(22) Filed: Jan. 29, 2010

(65) Prior Publication Data

US 2011/0072195 A1 Mar. 24, 2011

(30) Foreign Application Priority Data

Sep. 23, 2009 (TW) ................................ 98132100 A

(51) Int. Cl.
*G06F 12/00* (2006.01)
(52) U.S. Cl.
USPC ............ 711/103; 711/154; 711/157; 711/170
(58) Field of Classification Search .................. 711/103, 711/154, 157, 170
See application file for complete search history.

(56) References Cited

U.S. PATENT DOCUMENTS

| | | | | |
|---|---|---|---|---|
| 7,343,443 B1* | 3/2008 | Yang | .................................. | 711/5 |
| 8,341,332 B2* | 12/2012 | Ma et al. | ....................... | 711/103 |
| 2001/0014933 A1* | 8/2001 | Shibazaki et al. | ............ | 711/154 |
| 2002/0181285 A1* | 12/2002 | Hirosawa et al. | ........ | 365/185.22 |
| 2008/0034153 A1* | 2/2008 | Lee et al. | ....................... | 711/103 |
| 2008/0205153 A1* | 8/2008 | Kwon et al. | ............. | 365/185.18 |
| 2009/0168525 A1* | 7/2009 | Olbrich et al. | ........... | 365/185.11 |
| 2009/0172257 A1* | 7/2009 | Prins et al. | ..................... | 711/103 |
| 2009/0172258 A1* | 7/2009 | Olbrich et al. | ................ | 711/103 |
| 2009/0172259 A1* | 7/2009 | Prins et al. | ..................... | 711/103 |
| 2009/0172260 A1* | 7/2009 | Olbrich et al. | ................ | 711/103 |
| 2009/0172261 A1* | 7/2009 | Prins et al. | ..................... | 711/103 |
| 2009/0172262 A1* | 7/2009 | Olbrich et al. | ................ | 711/103 |
| 2009/0172263 A1* | 7/2009 | Olbrich et al. | ................ | 711/103 |
| 2009/0172308 A1* | 7/2009 | Prins et al. | ..................... | 711/154 |
| 2009/0172499 A1* | 7/2009 | Olbrich et al. | ................ | 714/773 |
| 2009/0248964 A1* | 10/2009 | Yano et al. | ..................... | 711/103 |
| 2010/0318749 A1* | 12/2010 | Matthews | ..................... | 711/149 |
| 2011/0185105 A1* | 7/2011 | Yano et al. | ..................... | 711/103 |

* cited by examiner

*Primary Examiner* — Arpan P. Savla

(74) *Attorney, Agent, or Firm* — Winston Hsu; Scott Margo

(57) ABSTRACT

A method for managing a memory device having multiple channels and multiple ways includes: with regard to a logical page, finding a Flash memory chip for being written from a plurality of Flash memory chips according to a predetermined order of the Flash memory chips, and during finding the Flash memory chip, omitting any Flash memory chip that is busy or not suitable for writing; and writing data belonging to the logical page and a serial number for indicating a writing order into a corresponding physical page within a block of the Flash memory chip that is found. An associated memory device and a controller thereof are also provided, where the controller includes: a ROM arranged to store a program code; and a microprocessor arranged to execute the program code to control the access to the Flash memory chips.

24 Claims, 4 Drawing Sheets

METHOD FOR MANAGING A MEMORY DEVICE HAVING MULTIPLE CHANNELS AND MULTIPLE WAYS, AND ASSOCIATED MEMORY DEVICE AND CONTROLLER THEREOF

BACKGROUND OF THE INVENTION

1. Field of the Invention

The present invention relates to access to a Flash memory, and more particularly, to a method for managing a memory device having multiple channels and multiple ways, and to an associated memory device and a controller thereof.

2. Description of the Prior Art

As technologies of Flash memories progress in recent years, many kinds of portable memory devices, such as memory cards respectively complying with SD/MMC, CF, MS, and XD standards, are widely implemented in various applications. Therefore, the control of access to Flash memories in these portable memory devices has become an important issue.

Taking NAND Flash memories as an example, they can mainly be divided into two types, i.e. Single Level Cell (SLC) Flash memories and Multiple Level Cell (MLC) Flash memories. Each transistor that is considered a memory cell in SLC Flash memories only has two charge levels that respectively represent a logical value 0 and a logical value 1. In addition, the storage capability of each transistor that is considered a memory cell in MLC Flash memories can be fully utilized. More specifically, the voltage for driving memory cells in the MLC Flash memories is typically higher than that in the SLC Flash memories, and different voltage levels can be applied to the memory cells in the MLC Flash memories in order to record information of two bits (e.g. binary values 00, 01, 11, or 10) in a transistor that is considered a memory cell. Theoretically, the storage density of the MLC Flash memories may reach twice the storage density of the SLC Flash memories, which is considered good news for NAND Flash memory manufacturers who encountered a bottleneck of NAND Flash technologies.

As MLC Flash memories are cheaper than SLC Flash memories, and are capable of providing higher capacity than SLC Flash memories while the space is limited, MLC Flash memories have been a main stream for implementation of most portable memory devices on the market. However, various problems of the MLC Flash memories have arisen due to their unstable characteristics. Therefore, some suggestions are provided in response to these problems in the related art.

In addition, in order to achieve the best overall performance of a portable memory device, it is workable to install a plurality of Flash memory chips in the portable memory device. However, improper management may cause some side effects. In this situation, the problems due to the unstable characteristics mentioned above would become even worse. Thus, a novel method is required for enhancing the control of data access to Flash memories, in order to guarantee the completeness of user data.

SUMMARY OF THE INVENTION

It is therefore an objective of the claimed invention to provide a method for managing a memory device having multiple channels and multiple ways, and to provide an associated memory device and a controller thereof, in order to solve the above-mentioned problems.

It is another objective of the claimed invention to provide a method for managing a memory device having multiple channels and multiple ways, and to provide an associated memory device and a controller thereof, in order to achieve the best overall performance of portable memory devices.

According to a preferred embodiment of the claimed invention, a method for managing a memory device having multiple channels and multiple ways is provided. The memory device comprises a plurality of Flash memory chips, where each Flash memory chip comprises a plurality of blocks. The method comprises: with regard to a logical page, finding a Flash memory chip for being written from the Flash memory chips according to a predetermined order of the Flash memory chips, and during finding the Flash memory chip, omitting any Flash memory chip that is busy or not suitable for writing; and writing data belonging to the logical page and a serial number for indicating a writing order into a corresponding physical page within a block of the Flash memory chip that is found.

While the method mentioned above is disclosed, an associated memory device having multiple channels and multiple ways is further provided. The memory device comprises: a plurality of Flash memory chips, where each Flash memory chip comprises a plurality of blocks; and a controller arranged to access the Flash memory chips and manage the blocks. In addition, with regard to a logical page, the controller finds a Flash memory chip for being written from the Flash memory chips according to a predetermined order of the Flash memory chips, and during finding the Flash memory chip, the controller omits any Flash memory chip that is busy or not suitable for writing. Additionally, the controller writes data belonging to the logical page and a serial number for indicating a writing order into a corresponding physical page within a block of the Flash memory chip that is found.

While the method mentioned above is disclosed, a controller of a memory device having multiple channels and multiple ways is further provided, where the controller is utilized for accessing a plurality of Flash memory chips, and each Flash memory chip comprises a plurality of blocks. The controller comprises: a read only memory (ROM) arranged to store a program code; and a microprocessor arranged to execute the program code to control the access to the Flash memory chips and manage the plurality of blocks. In addition, with regard to a logical page, the controller that executes the program code by utilizing the microprocessor finds a Flash memory chip for being written from the Flash memory chips according to a predetermined order of the Flash memory chips, and during finding the Flash memory chip, the controller that executes the program code by utilizing the microprocessor omits any Flash memory chip that is busy or not suitable for writing. Additionally, the controller that executes the program code by utilizing the microprocessor writes data belonging to the logical page and a serial number for indicating a writing order into a corresponding physical page within a block of the Flash memory chip that is found.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
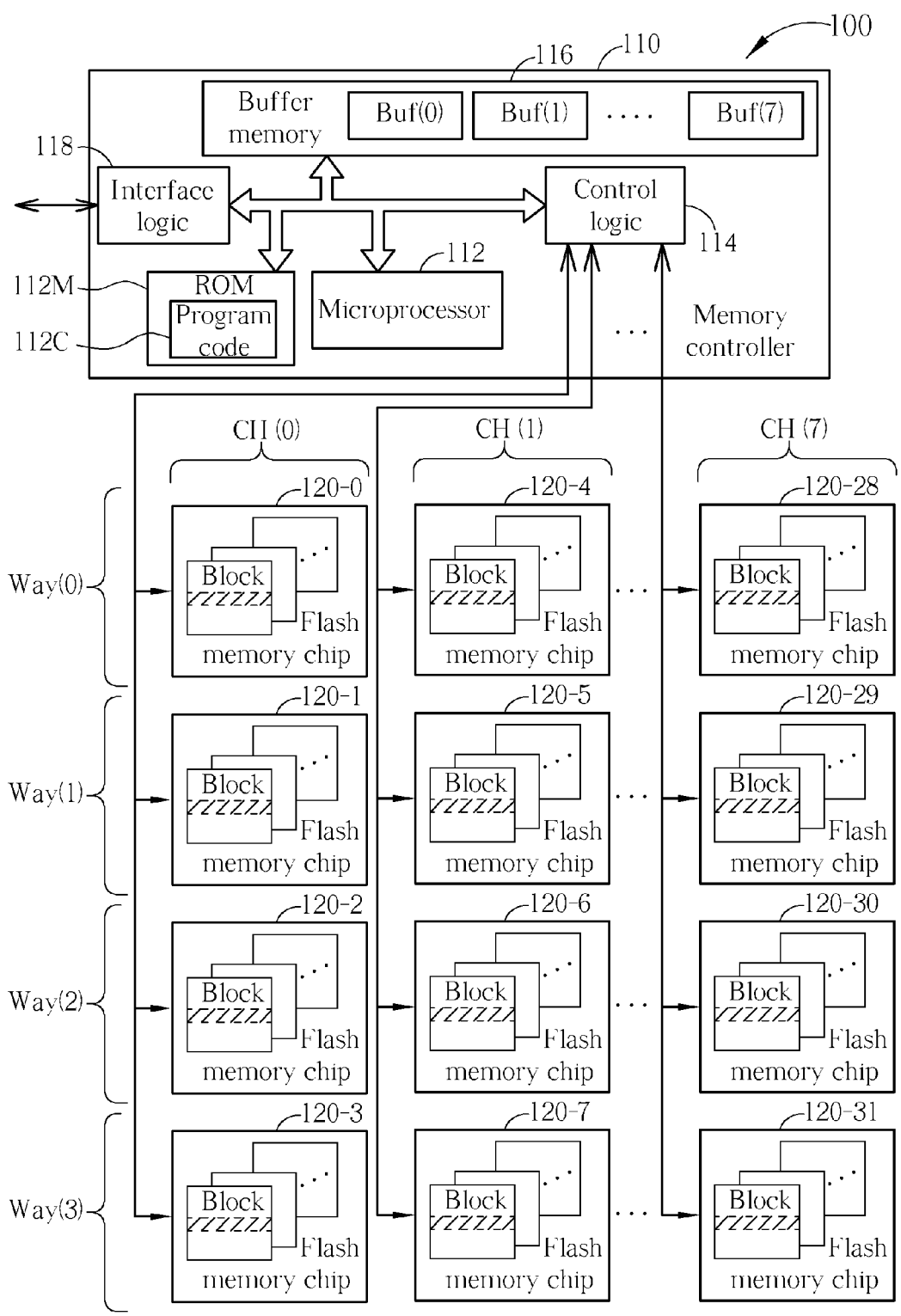
FIG. 1 is a diagram of a memory device having multiple channels and multiple ways according to a first embodiment of the present invention.

Please refer to FIG. 1, which illustrates a diagram of a memory device 100 having multiple channels and multiple ways according to a first embodiment of the present invention. In particular, the memory device 100 of this embodiment is a portable memory device, such as a memory card complying with SD/MMC, CF, MS, or XD standards. The memory device 100 comprises a plurality of Flash memory chips 120-0, 120-1, . . . , and 120-31, and further comprises a controller arranged to access the Flash memory chips 120-0, 120-1, . . . , and 120-31, where the aforementioned controller of this embodiment is a memory controller 110. According to this embodiment, the memory controller 110 comprises a microprocessor 112, a read only memory (ROM) 112M, a control logic 114, a buffer memory 116, and an interface logic 118.

In this embodiment, the buffer memory 116 comprises a plurality of buffering regions Buf(0), Buf(1), . . . , and Buf(7) respectively corresponding to the channels Ch(0), Ch(1), . . . , and Ch(7). This is for illustrative purposes only, and is not meant to be a limitation of the present invention. According to a variation of this embodiment, the controller can dynamically change the corresponding relationships between the buffering regions Buf(0), Buf(1), . . . , and Buf(7) and the channels Ch(0), Ch(1), . . . , and Ch(7). That is, the controller can change the order of the buffering regions Buf(0), Buf(1), . . . , and Buf(7), in order to assign data of any buffering region to any channel. In addition, the ROM 112M of this embodiment is arranged to store a program code 112C, and the microprocessor 112 is arranged to execute the program code 112C to control the access to the Flash memory chips 120-0, 120-1, . . . , and 120-31. Please note that, according to different variations of this embodiment, the program code 112C can be stored in the buffer memory 116 or any other memory.

Typically, each Flash memory chip within the Flash memory chips 120-0, 120-1, . . . , and 120-31 comprises a plurality of blocks, and the controller (e.g. the memory controller 110 that executes the program code 112C by utilizing the microprocessor 112) performs data erasure operations on each Flash memory chip by erasing in units of blocks. In addition, a block can be utilized for recording a specific amount of pages, where the controller mentioned above performs data writing operations on each Flash memory chip by writing/programming in units of pages.

In practice, the memory controller 110 that executes the program code 112C by utilizing the microprocessor 112 is capable of performing various control operations by utilizing the internal components within the memory controller 110. For example, the memory controller 110 utilizes the control logic 114 to control access to each Flash memory chip (e.g. operations of accessing at least one block or at least one page), utilizes the buffer memory 116 to perform buffering operations for the memory controller 110, and utilizes the interface logic 118 to communicate with a host device.

According to this embodiment, in addition to accessing the Flash memory chips, the controller is capable of properly managing the plurality of blocks. More specifically, with regard to a logical page, the controller finds a Flash memory chip for being written from the Flash memory chips 120-0, 120-1, . . . , and 120-31 according to a predetermined order of the Flash memory chips 120-0, 120-1, . . . , and 120-31. During finding the Flash memory chip, the controller omits any Flash memory chip that is busy or not suitable for writing. In addition, the controller writes data belonging to the logical page and a serial number for indicating a writing order into a corresponding physical page within a block of the Flash memory chip that is found.

Here, the Flash memory chips respectively correspond to the channels and the ways. More particularly, the Flash memory chips of the same column as illustrated in FIG. 1 correspond to the same channel, and have a common bus, where the controller can access any Flash memory chip of this channel directly through the common bus. For example, the memory device 100 comprises 8 columns of Flash memory chips {120-0, 120-1, 120-2, 120-3}, {120-4, 120-5, 120-6, 120-7}, . . . , and {120-28, 120-29, 120-30, 120-31} respectively corresponding to the channels Ch(0), Ch(1), . . . , and Ch(7). In addition, the Flash memory chips of the same row as illustrated in FIG. 1 correspond to the same way, where within the Flash memory chips of a certain channel, the controller can select the Flash memory chip of any way through the 4-way interleave technologies. For example, the memory device 100 comprises 4 rows of Flash memory chips {120-0, 120-4, . . . , 120-28}, {120-1, 120-5, . . . , 120-29}, {120-2, 120-6, . . . , 120-30}, and {120-3, 120-7, . . . , 120-31} respectively corresponding to the ways Way(0), Way(1), Way(2), and Way(3). Additionally, the controller can enable/disable the respective Flash memory chips 120-0, 120-1, . . . , and 120-31 by utilizing the chip enable signals CE(0), CE(1), . . . , and CE(31), in order to manage the access to any Flash memory chip. In practice, when it is required to select any Flash memory chip for being accessed, the memory device 100 (and more particularly, the controller) can select a certain Flash memory chip within the Flash memory chips by assigning a combination Comb(x, y) of a channel Ch(x) and a way Way(y), and the predetermined order mentioned above represents a predetermined switching order in response to the channel variation and/or the way variation, where the notations x and y represent the channel index (index of the channel Ch(x)) and the way index (index of the way Way(y)), respectively. In this embodiment, the predetermined switching order can be expressed by utilizing the following sequence:

{Comb(0, 0), Comb(1, 0), . . . , Comb(7, 0),
Comb(0, 1), Comb(1, 1), . . . , Comb(7, 1),
Comb(0, 2), Comb(1, 2), . . . , Comb(7, 2),
Comb(0, 3), Comb(1, 3), . . . , Comb(7, 3)}.

That is, the predetermined switching order starts from the first row of Flash memory chips {120-0, 120-4, . . . , 120-28}, from the leftmost Flash memory chip through to the rightmost Flash memory chip. Next, the predetermined switching order continues with the second row of Flash memory chips {120-1, 120-5, . . . , 120-29}, from the leftmost Flash memory chip through to the rightmost Flash memory chip. Then, the predetermined switching order continues with the third row of Flash memory chips {120-2, 120-6, . . . , 120-30}, from the leftmost Flash memory chip through to the rightmost Flash memory chip. Subsequently, the predetermined switching order continues with the fourth row of Flash memory chips {120-3, 120-7, . . . , 120-31}, from the leftmost Flash memory chip through to the rightmost Flash memory chip. This is for illustrative purposes only, and is not meant to be a limitation of the present invention. According to different variations of this embodiment, the predetermined switching order can be varied. Related details are further described as follows by referring to FIG. 2.

Figure 2:
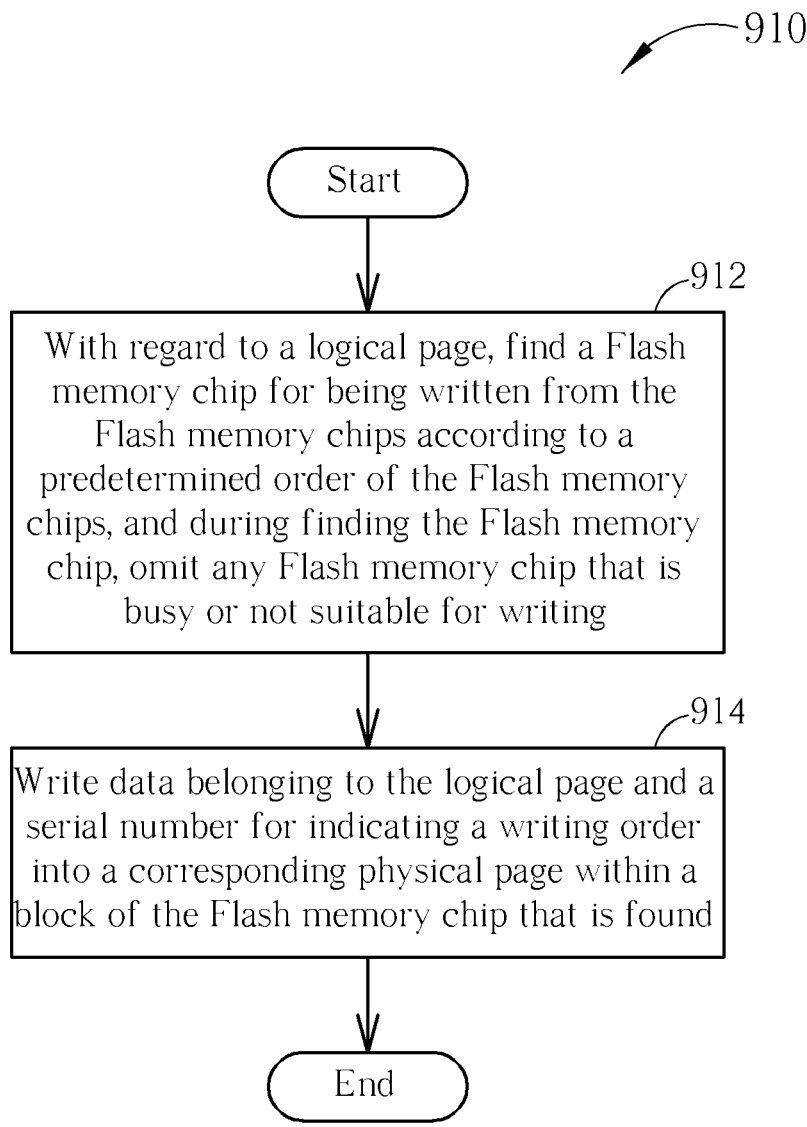
FIG. 2 is a flowchart of a method for managing a memory device having multiple channels and multiple ways according to an embodiment of the present invention.

FIG. 2 is a flowchart of a method 910 for managing a memory device having multiple channels and multiple ways according to an embodiment of the present invention. The method can be applied to the memory device 100 shown in FIG. 1, and more particularly, to the controller mentioned above (e.g. the memory controller 110 that executes the program code 112C by utilizing the microprocessor 112). In addition, the method can be implemented by utilizing the memory device 100 shown in FIG. 1, and more particularly, by utilizing the controller mentioned above. The method 910 is described as follows.

In Step 912, with regard to a logical page LPage(j), the aforementioned controller (e.g. the memory controller 110 that executes the program code 112C by utilizing the microprocessor 112) finds a Flash memory chip for being written from the Flash memory chips 120-0, 120-1, ..., and 120-31 according to a predetermined order of the Flash memory chips 120-0, 120-1, ..., and 120-31 (and more particularly, the aforementioned predetermined order), and during finding the Flash memory chip, the controller omits any Flash memory chip that is busy or not suitable for writing.

As mentioned, each Flash memory chip within the Flash memory chips 120-0, 120-1, ..., and 120-31 comprises a plurality of blocks. For better comprehension, the respective blocks of each Flash memory chip are illustrated as a plurality of layers, as shown in FIG. 1. In this embodiment, the logical page LPage(j) belongs to a logical block LB(i), and each Flash memory chip comprises a physical block PB(i) corresponding to the logical block LB(i), where the physical block PB(i) is illustrated as the $i^{th}$ layer of each Flash memory chip shown in FIG. 1. For example, when i=0, the physical block PB(i) can be illustrated as the uppermost layer of each Flash memory chip shown in FIG. 1. In addition, the physical block PB(i) comprises a physical page PPage(j) corresponding to the logical page LPage(j). For example, when i=0, the physical page PPage(j) can be illustrated as the shaded stripe within the uppermost layer of each Flash memory chip shown in FIG. 1. Thus, with regard to the logical page LPage(j), the controller searches for the physical page for being written from the corresponding physical page PPage(j) of the respective Flash memory chips 120-0, 120-1, ..., and 120-31 according to the predetermined order, and during finding the Flash memory chip, the controller omits any Flash memory chip that is busy or not suitable for writing.

In Step 914, the controller writes data belonging to the logical page LPage(j) and a serial number for indicating a writing order into a corresponding physical page within a block of the Flash memory chip that is found. More particularly, the controller writes the data and the serial number into the corresponding physical page PPage(j) within the block PB(i) of the Flash memory chip that is found.

Please note that the operations shown in FIG. 2 (i.e. those of Step 912 and Step 914) can be performed multiple times. As a result, taking a situation where i=0 as an example, the controller switches among the shaded stripes within the uppermost layer of the respective Flash memory chips shown in FIG. 1 according to the predetermined order represented by the aforementioned sequence {Comb(0, 0), Comb(1, 0), ..., Comb(7, 0), Comb(0, 1), Comb(1, 1), ..., Comb(7, 1), Comb(0, 2), Comb(1, 2), ..., Comb(7, 2), Comb(0, 3), Comb(1, 3), ..., Comb(7, 3)}, in order to search for the corresponding physical page to be written regarding the logical page LPage(j), within the Flash memory chips 120-0, 120-1, ..., and 120-31, and to further write the data belonging to the logical page LPage(j) and the serial number representing the writing order of the data into the corresponding physical page PPage(j) of the latest found Flash memory chip.

In addition, the processing based upon the predetermined order mentioned above can keep on recurring. That is, after completing the first round of finding with regard to the logical page LPage(j), the controller can switch back to the first Flash memory chip 120-0 of the first row of Flash memory chips {120-0, 120-4, ..., 120-28} shown in FIG. 1, in order to start the next round of finding with regard to the logical page LPage(j) according to the same predetermined order. In particular, with regard to the logical page LPage(j), the controller finds the latest Flash memory chip for being written from at least one portion of the previously omitted Flash memory chips (e.g. the previously omitted busy Flash memory chips) according to the predetermined order.

According to this embodiment, the controller can determine whether the Flash memory chips 120-0, 120-1, ..., and 120-31 are busy according to the chip enable signals CE(0), CE(1), ..., and CE(31), respectively. For example, when the controller triggers the access to a certain physical block within a certain Flash memory chip except for the physical block PB(i), the chip enable signal of this Flash memory chip is in an enable status, so the controller can detect that this Flash memory chip is busy, accordingly. Additionally, with regard to the logical page LPage(j), according to whether the corresponding physical page PPage(j) of a specific Flash memory chip of the Flash memory chips 120-0, 120-1, ..., and 120-31 is a blank page, the controller can determine whether the specific Flash memory chip is suitable for writing. When the corresponding physical page PPage(j) of the specific Flash memory chip is not a blank page, the controller determines that the specific Flash memory chip is not suitable for writing.

In practice, during writing data into at least one Flash memory chip of the Flash memory chips 120-0, 120-1, ..., and 120-31, the controller establishes/updates at least one page linking table, and stores the page linking table in the buffer memory 116, where the page linking table indicates linking relationships between logical pages and physical pages or linking relationships between physical pages and logical pages, and can be utilized as a reference for accessing data. As a result, the controller can determine whether the corresponding physical page PPage(j) of the specific Flash memory chip is a blank page according to the page linking table. In addition, when the page linking table is damaged or gets lost, the controller can re-establish the page linking table according to the serial number(s). As the operations shown in FIG. 2 can be executed multiple times, there are typically multiple serial numbers that can be utilized as a reference for re-establishing the page linking table. This is for illustrative purposes only, and is not meant to be a limitation of the present invention. According to different variations of this embodiment, the controller can store the page linking table into any memory available (e.g. the buffer memory 116 and/or the ROM 112M), and backup the latest contents of the page linking table into at least one Flash memory chip at any time, in order to keep the copy thereof. Thus, when the page linking table is damaged or gets lost, the controller can re-establish the page linking table according to the serial number(s) and the copy of at least one portion of the page linking table.

Figure 3:
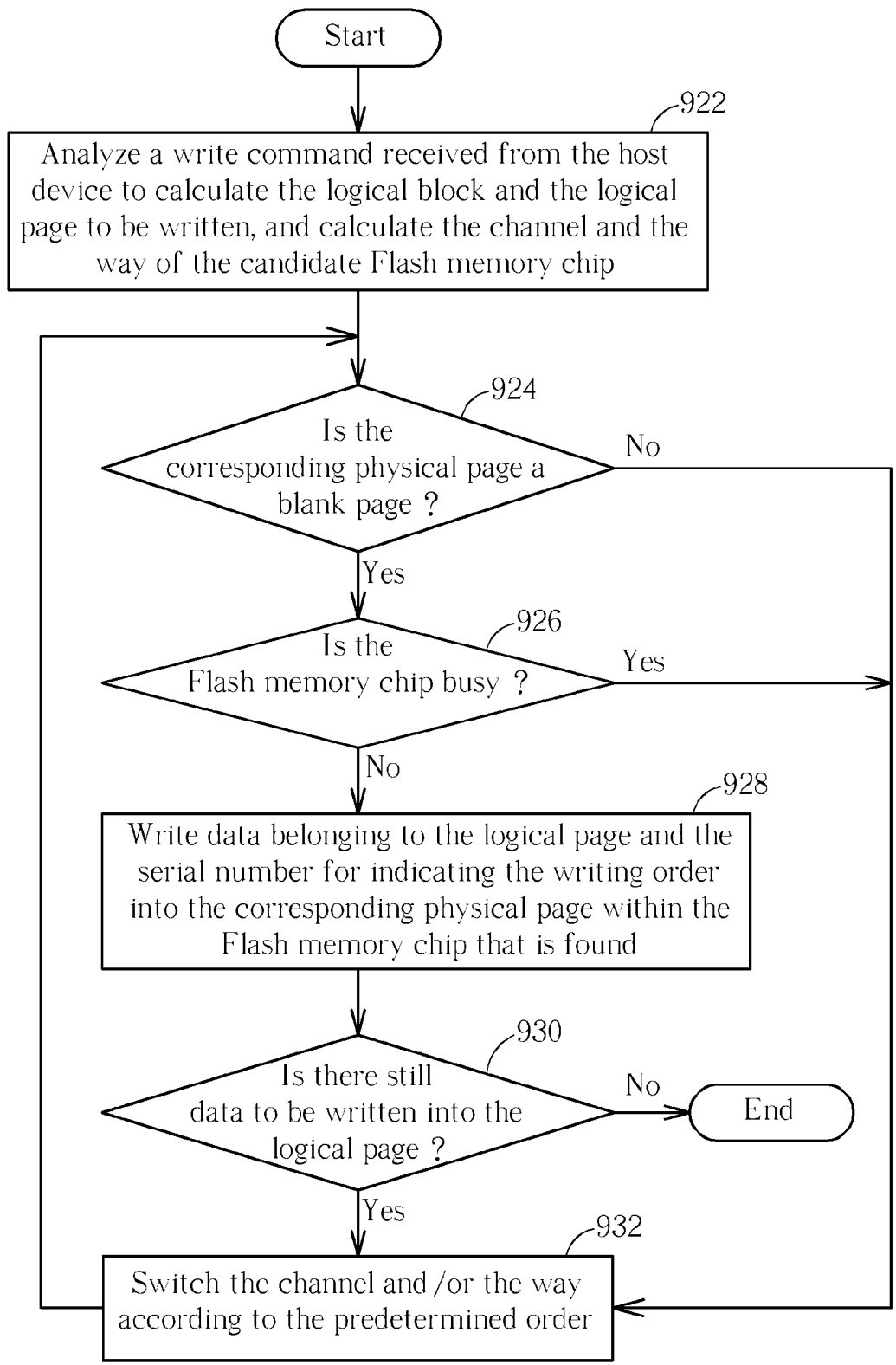
FIG. 3 and FIG. 4 illustrate implementation details of the method shown in FIG. 2 according to different embodiments of the present invention, respectively.

FIG. 3 illustrates implementation details of the method shown in FIG. 2 according to an embodiment of the present invention, where the working flow shown in FIG. 3 discloses operations regarding a logical page, and more particularly, the logical page LPage(j).

In Step 922, the aforementioned controller (e.g. the memory controller 110 that executes the program code 112C by utilizing the microprocessor 112) analyzes a write command received from the host device to calculate the logical block LB(i) and the logical page LPage(j) to be written, and calculates the channel and the way of a candidate Flash memory chip 120-z, where z=(4*x)+y, x=0, 1, ..., or 7, and y=0, 1, 2, or 3. For example, when there is not any record that can indicate as to the latest candidate Flash memory chip should be which of the Flash memory chips 120-0, 120-1, ..., and 120-31, the controller can select the first Flash memory chip 120-0 complying with the predetermined order as the candidate Flash memory chip 120-z. In another example, in a situation where the controller has ever recorded that the previous candidate Flash memory chip is a certain one of the Flash memory chips 120-0, 120-1, ..., and 120-31, the controller switches the channel and/or the way according to the predetermined order, in order to select the next Flash memory chip complying with the predetermined order as the candidate Flash memory chip 120-z.

In Step 924, the controller checks whether the corresponding physical page PPage(j) within the physical block PB(i) of the candidate Flash memory chip 120-z is a blank page. When the corresponding physical page PPage(j) within the physical block PB(i) of the candidate Flash memory chip 120-z is a blank page, Step 926 is entered; otherwise, Step 932 is entered.

In Step 926, the controller checks whether the Flash memory chip (i.e. the candidate Flash memory chip 120-z) is busy. More particularly, the controller detects whether the status of the chip enable signal CE(z) of the candidate Flash memory chip 120-z is in an enable status in order to determine whether the candidate Flash memory chip 120-z is busy. When it is detected that the candidate Flash memory chip 120-z is busy, Step 932 is entered; otherwise, Step 928 is entered.

In Step 928, the controller writes the data belonging to the logical page LPage(j) and the serial number for indicating the writing order into the corresponding physical page PPage(j) within the Flash memory chip that is found (i.e. the candidate Flash memory chip 120-z).

In Step 930, the controller checks whether there is still data to be written into the logical page LPage(j). More particularly, the controller detects whether a remaining write length parameter of the logical page LPage(j) is greater than zero in order to determine whether there is still data to be written into the logical page LPage(j). When it is detected that there is still data to be written into the logical page LPage(j), Step 932 is entered; otherwise, end this working flow.

In Step 932, the controller switches the channel and/or the way according to the predetermined order, in order to select the next Flash memory chip complying with the predetermined order as the latest candidate Flash memory chip. For example, when z does not reach 31 and x does not reach 7 (i.e. in a situation where z<31 and x<7), the controller switches to the channel Ch(x+1) and maintains in the same way Way(y), in order to select the Flash memory chip **120-(4*(x+1)+y) as the latest candidate Flash memory chip. In another example, when z does not reach 31 and x=7, the controller switches to the channel Ch(0) and the way Way(y+1), in order to select the Flash memory chip 120-(y+1) as the latest candidate Flash memory chip. In another example, when z=31, the controller switches to the channel Ch(0) and the way Way(0), in order to select the Flash memory chip 120-0** as the latest candidate Flash memory chip.

Figure 4:
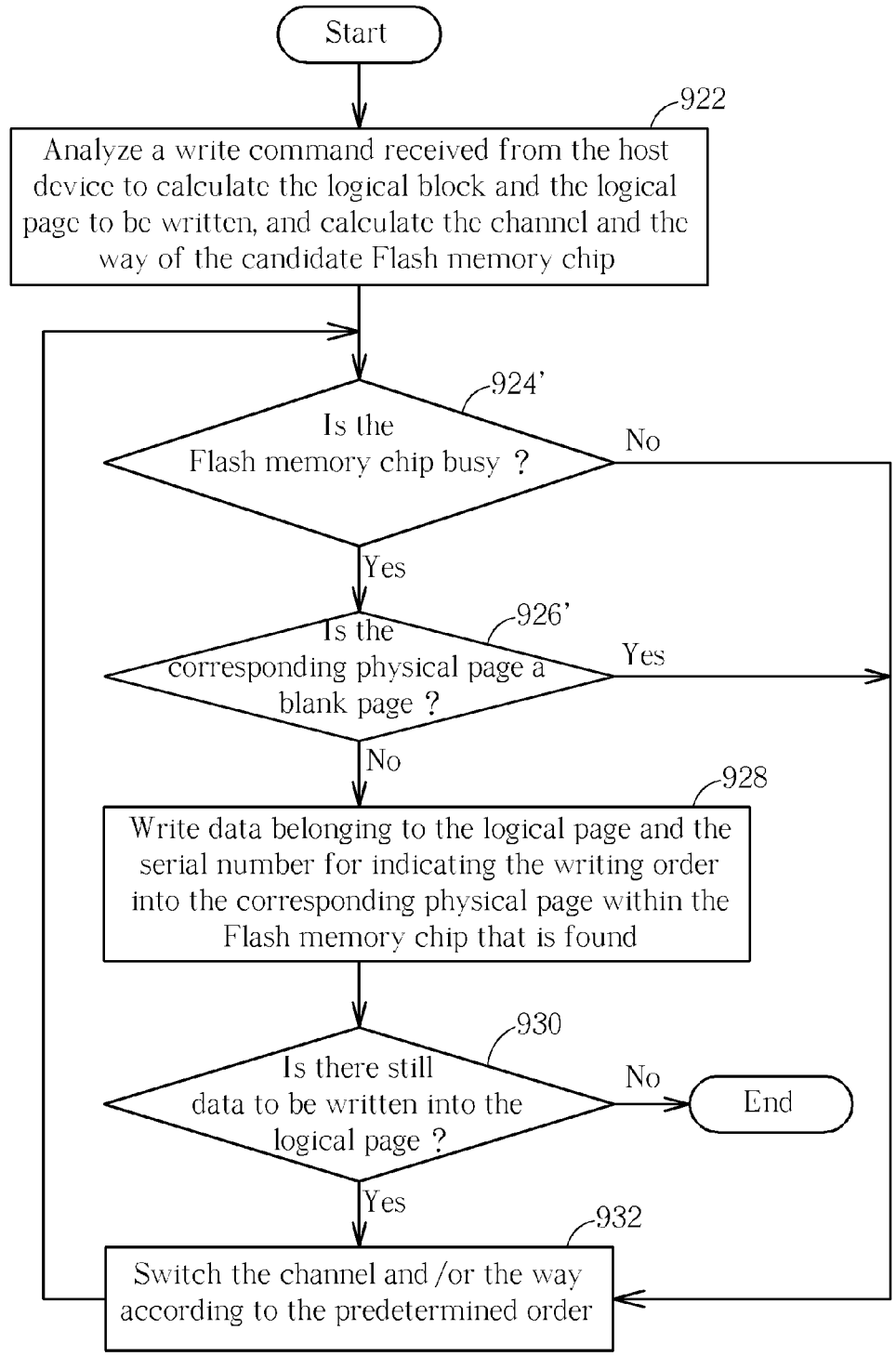

Please note that, in Step 924, when it is determined that the corresponding physical page PPage(j) of the Flash memory chip 120-z is a blank page, the controller then determines whether the Flash memory chip 120-z is busy. This is for illustrative purposes only, and is not meant to be a limitation of the present invention. According to a variation of this embodiment, such as the embodiment shown in FIG. 4, the order of the checking operations of Step 924 and Step 926 disclosed above can be exchanged. In the embodiment shown in FIG. 4, Step 924 and Step 926 shown in FIG. 3 are respectively replaced by Step 924' and Step 926', which are described as follows:

In Step 924', the controller checks whether the Flash memory chip (i.e. the candidate Flash memory chip 120-z) is busy. When it is detected that the candidate Flash memory chip 120-z is busy, Step 932 is entered; otherwise, Step 926' is entered.

In Step 926', the controller checks whether the corresponding physical page PPage(j) within the physical block PB(i) of the candidate Flash memory chip 120-z is a blank page. When the corresponding physical page PPage(j) within the physical block PB(i) of the candidate Flash memory chip 120-z is a blank page, Step 928 is entered; otherwise, Step 932 is entered. Similar descriptions for this variation are not repeated in detail here.

It is an advantage of the present invention that, when writing the data mentioned in Step 914, the controller also writes the serial number for indicating the writing order of the data into the corresponding physical page PPage(j) within the physical block PB(i) of the Flash memory chip that is found, so in a situation where the controller utilizes the page linking table mentioned above as the reference for accessing data, once the page linking table is damaged or gets lost, the controller can re-establish the page linking table according to the serial numbers that have ever been written. In addition, during finding the Flash memory chip mentioned in Step 912, the controller omits any Flash memory chip that is busy or not suitable for writing, and immediately continues finding and has no need to wait, so the present invention can achieve the best overall performance of portable memory devices. Additionally, the controller can find the latest Flash memory chip for being written from at least one portion of the previously omitted Flash memory chips (e.g. the previously omitted busy Flash memory chips) according to the predetermined order, so the present invention provides high flexibility and the best performance in real operations.

Those skilled in the art will readily observe that numerous modifications and alterations of the device and method may be made while retaining the teachings of the invention.

What is claimed is:

1. A method for managing a memory device having multiple channels and multiple ways, the memory device comprising a plurality of Flash memory chips, each Flash memory chip comprising a plurality of blocks, the method comprising:

finding a Flash memory chip for being written from the Flash memory chips according to a predetermined order of the Flash memory chips, and during finding the Flash memory chip, omitting any Flash memory chip that is busy and omitting any Flash memory chip that is not suitable for writing; and writing data belonging to a logical page into a corresponding physical page within a block of the Flash memory chip that is found, and writing a serial number for indicating a writing order into the corresponding physical page;

wherein the Flash memory chips respectively correspond to the channels and the ways, and the memory device selects a certain Flash memory chip within the Flash memory chips by assigning a combination of a channel and a way; and the predetermined order represents a predetermined switching order in response to at least one of channel variation and way variation.

2. The method of claim 1, wherein the predetermined order represents a predetermined switching order in response to at least one of variation of a channel index of the channels and variation of a way index of the ways.

3. The method of claim 1, further comprising:
finding a latest Flash memory chip for being written from at least one portion of previously omitted Flash memory chips according to the predetermined order.

4. The method of claim 1, wherein the step of omitting any Flash memory chip that is busy and omitting any Flash memory chip that is not suitable for writing further comprises:
according to whether a corresponding physical page of a specific Flash memory chip of the Flash memory chips is a blank page, determining whether the specific Flash memory chip is suitable for writing.

5. The method of claim 4, wherein the step of omitting any Flash memory chip that is busy and omitting any Flash memory chip that is not suitable for writing further comprises:
when it is determined that the corresponding physical page of the specific Flash memory chip is a blank page, then determining whether the specific Flash memory chip is busy.

6. The method of claim 4, further comprising:
during writing data into at least one Flash memory chip, establishing or updating at least one page linking table, wherein the page linking table indicates linking relationships between logical pages and physical pages or linking relationships between physical pages and logical pages;
wherein the step of omitting any Flash memory chip that is busy and omitting any Flash memory chip that is not suitable for writing further comprises:
determining whether the corresponding physical page of the specific Flash memory chip is a blank page according to the page linking table.

7. The method of claim 6, further comprising:
when the page linking table is damaged or gets lost, re-establishing the page linking table according to the serial number.

8. The method of claim 1, wherein the logical page belongs to a logical block, each Flash memory chip comprises a physical block corresponding to the logical block, and the physical block comprises a physical page corresponding to the logical page.

9. A memory device having multiple channels and multiple ways, the memory device comprising:
a plurality of Flash memory chips, each Flash memory chip comprising a plurality of blocks; and
a controller arranged to access the Flash memory chips and manage the blocks, wherein the controller finds a Flash memory chip for being written from the Flash memory chips according to a predetermined order of the Flash memory chips, and during finding the Flash memory chip, the controller omits any Flash memory chip that is busy and omits any Flash memory chip that is not suitable for writing;
wherein the controller writes data belonging to a logical page into a corresponding physical page within a block of the Flash memory chip that is found, and writes a serial number for indicating a writing order into the corresponding physical page;
the Flash memory chips respectively correspond to the channels and the ways, and the memory device selects a certain Flash memory chip within the Flash memory chips by assigning a combination of a channel and a way; and
the predetermined order represents a predetermined switching order in response to at least one of channel variation and way variation.

10. The memory device of claim 9, wherein the predetermined order represents a predetermined switching order in response to at least one of variation of a channel index of the channels and variation of a way index of the ways.

11. The memory device of claim 9, wherein the controller finds a latest Flash memory chip for being written from at least one portion of previously omitted Flash memory chips according to the predetermined order.

12. The memory device of claim 9, wherein according to whether a corresponding physical page of a specific Flash memory chip of the Flash memory chips is a blank page, the controller determines whether the specific Flash memory chip is suitable for writing.

13. The memory device of claim 12, wherein when it is determined that the corresponding physical page of the specific Flash memory chip is a blank page, the controller then determines whether the specific Flash memory chip is busy.

14. The memory device of claim 12, wherein during writing data into at least one Flash memory chip, the controller establishes or updates at least one page linking table, and the page linking table indicates linking relationships between logical pages and physical pages or linking relationships between physical pages and logical pages; and the controller determines whether the corresponding physical page of the specific Flash memory chip is a blank page according to the page linking table.

15. The memory device of claim 14, wherein when the page linking table is damaged or gets lost, the controller re-establishes the page linking table according to the serial number.

16. The memory device of claim 9, wherein the logical page belongs to a logical block, each Flash memory chip comprises a physical block corresponding to the logical block, and the physical block comprises a physical page corresponding to the logical page.

17. A controller of a memory device having multiple channels and multiple ways, the controller being utilized for accessing a plurality of Flash memory chips, each Flash memory chip comprising a plurality of blocks, the controller comprising:
a read only memory (ROM) arranged to store a program code; and
a microprocessor arranged to execute the program code to control the access to the Flash memory chips and manage the plurality of blocks, wherein the controller that executes the program code by utilizing the microprocessor finds a Flash memory chip for being written from the Flash memory chips according to a predetermined order of the Flash memory chips, and during finding the Flash memory chip, the controller that executes the program code by utilizing the microprocessor omits any Flash memory chip that is busy and omits any Flash memory chip that is not suitable for writing;
wherein the controller that executes the program code by utilizing the microprocessor writes data belonging to a logical page into a corresponding physical page within a block of the Flash memory chip that is found, and writes a serial number for indicating a writing order into the corresponding physical page;
the Flash memory chips respectively correspond to the channels and the ways, and the memory device selects a certain Flash memory chip within the Flash memory chips by assigning a combination of a channel and a way; and the predetermined order represents a predetermined switching order in response to at least one of channel variation and way variation.

18. The controller of claim 17, wherein the predetermined order represents a predetermined switching order in response to at least one of variation of a channel index of the channels and variation of a way index of the ways.

19. The controller of claim 17, wherein the controller that executes the program code by utilizing the microprocessor finds a latest Flash memory chip for being written from at least one portion of previously omitted Flash memory chips according to the predetermined order.

20. The controller of claim 17, wherein according to whether a corresponding physical page of a specific Flash memory chip of the Flash memory chips is a blank page, the controller that executes the program code by utilizing the microprocessor determines whether the specific Flash memory chip is suitable for writing.

21. The controller of claim 20, wherein when it is determined that the corresponding physical page of the specific Flash memory chip is a blank page, the controller that executes the program code by utilizing the microprocessor then determines whether the specific Flash memory chip is busy.

22. The controller of claim 20, wherein during writing data into at least one Flash memory chip, the controller that executes the program code by utilizing the microprocessor establishes or updates at least one page linking table, and the page linking table indicates linking relationships between logical pages and physical pages or linking relationships between physical pages and logical pages; and the controller that executes the program code by utilizing the microprocessor determines whether the corresponding physical page of the specific Flash memory chip is a blank page according to the page linking table.

23. The controller of claim 22, wherein when the page linking table is damaged or gets lost, the controller that executes the program code by utilizing the microprocessor re-establishes the page linking table according to the serial number.

24. The controller of claim 17, wherein the logical page belongs to a logical block, each Flash memory chip comprises a physical block corresponding to the logical block, and the physical block comprises a physical page corresponding to the logical page.

* * * * *